United States Patent
Gray (10) Patent No.: US 9,763,429 B2
(45) Date of Patent: Sep. 19, 2017

(54) PIPE AND SIPHON RECEPTACLE APPARATUS COUPLING ADAPTOR

(76) Inventor: Eric Gray, Pahrump, NV (US)

( * ) Notice: Subject to any disclaimer, the term of this patent is extended or adjusted under 35 U.S.C. 154(b) by 456 days.

(21) Appl. No.: 13/537,030

(22) Filed: Jun. 28, 2012

(65) Prior Publication Data

US 2013/0038052 A1    Feb. 14, 2013

Related U.S. Application Data (63) Continuation-in-part of application No. 12/778,003, filed on May 11, 2010, now abandoned, which is a continuation-in-part of application No. 11/566,451, filed on Dec. 4, 2006, now Pat. No. 7,717,474.

(51) Int. Cl.
*F16L 39/00* (2006.01)
*A01K 63/04* (2006.01)
*F16L 43/00* (2006.01)

(52) U.S. Cl.
CPC .......... *A01K 63/045* (2013.01); *F16L 39/00* (2013.01); *F16L 43/008* (2013.01); *Y10T 29/49428* (2015.01)

(58) Field of Classification Search
USPC ......... 285/122.1, 123.1, 125.1, 129.1–129.2, 285/130.1, 134.1
See application file for complete search history.

(56) References Cited

U.S. PATENT DOCUMENTS

| | | | |
|---|---|---|---|
| 110,114 A | 12/1870 | Conner | |
| 313,393 A | 3/1885 | Westinghouse | |
| 779,398 A | 1/1905 | Calkins | |
| 985,969 A | 3/1911 | Beckway | |
| 993,095 A | 5/1911 | Nilson | |
| 1,417,393 A | 5/1922 | Lassiter et al. | |
| 1,417,395 A | 5/1922 | Lassiter et al. | |
| 1,417,396 A | 5/1922 | Lassiter et al. | |
| 1,427,107 A | 8/1922 | Kaplan | |
| 1,782,380 A | 11/1930 | Daley | |
| 3,373,452 A | 3/1968 | Watts | |
| 3,670,758 A | 6/1972 | Willinger | |
| 3,738,491 A | 6/1973 | Dockery | |
| 3,860,269 A | 1/1975 | Horton et al. | |
| 3,998,478 A | 12/1976 | Zopfi | |
| 4,035,299 A | 7/1977 | Vroeginday | |
| 4,761,227 A | 8/1988 | Willinger et al. | |
| 4,842,305 A | 6/1989 | Kistenich et al. | |

(Continued)

FOREIGN PATENT DOCUMENTS

DE      2386285 A1 *  11/2011  ............ A61J 1/1475

OTHER PUBLICATIONS

Rob's Reef: ProClear Small Overflow Siphon Box, http://www.robsreef.com/Merchant2/merchant.mvc?Screen=PROD&Store_Code=RR&Product_Code=sm . . . , printed May 31, 2006.

*Primary Examiner* — Aaron Dunwoody
*Assistant Examiner* — Fannie Kee
(74) *Attorney, Agent, or Firm* — Weide & Miller, Ltd.

(57) ABSTRACT

An adaptor for coupling pipes together that has a pair of spaced apart pipe members disposed parallel to each other. Each of the pipe members include an opening at a top and at the bottom for receiving an additional pipe. A bridging member connects the pair of pipe members and defines a passage between the pipe members. The bridging member comprises an open top allowing access to the interior of the adaptor.

13 Claims, 6 Drawing Sheets

(56) References Cited

U.S. PATENT DOCUMENTS

| | | |
|---|---|---|
| 4,842,727 A | 6/1989 | Willinger et al. |
| 5,148,597 A | 9/1992 | Weeks |
| 5,728,293 A | 3/1998 | Guoli et al. |
| 5,992,466 A | 11/1999 | Weise |

* cited by examiner

PIPE AND SIPHON RECEPTACLE APPARATUS COUPLING ADAPTOR

CROSS REFERENCE TO RELATED APPLICATION

This application is a continuation-in-part of, and claims priority to, U.S. patent application Ser. No. 12/778,003, which is a continuation-in-part of, and claimed priority to, U.S. patent application Ser. No. 11/566,451, filed on Dec. 4, 2006 and now U.S. Pat. No. 7,717,474.

FIELD

The disclosed embodiments relate to an adaptor that is especially useful for coupling common plumbing components to create an overflow siphon apparatus.

BACKGROUND

A variety of devices are known to exist for coupling pipes together ranging from standard fittings to adhesives. A fitting must provide good connectability, and, depending on the application, access to other pipe components and adequate pressure resistance. Thus, for example, a siphon or overflow box of the type commonly used for aquariums ideally would be made from pipes and fittings that are economical to make, easy to assemble, simple to disassemble for cleaning, and adequately well connected to resist any leaks resulting from the large volume of water constantly moving through these apparatuses. However, most siphons or overflow boxes today are made from injection molded or assembled pieces of flat material that are relatively expensive to manufacture and are not easy to disassemble or clean.

U.S. Pat. No. 4,761,227 issued to Willinger et al. discloses a "overflow box-type" aquarium filter that includes an intake chamber for receiving contaminated aquarium water from the aquarium tank and a filter chamber in flow communication with the intake chamber. An impeller serves to draw water from the aquarium tank to the intake chamber through a removable intake U-tube. Upon stoppage of the impeller, the flow of water reverses and flows back into the aquarium tank. While this device may be suitable for its particular purpose, it is unnecessarily complicated and requires that the impeller stops before too much water is drawn into the filter chamber such that overflow occurs.

U.S. Pat. No. 5,728,293 by Guoli et al. discloses a filter assembly that has a generally U-shaped siphon tube that has telescopic legs and a flow regulator that provide for flow between the filter assembly and the aquarium tank. While the U-shaped siphon tube is removable from both the filter area and tank for cleaning, the flow regulator and removable legs make this siphon relatively complex to manufacture and increase the risk that a part of the siphon will be lost or broken from disassembly and handling.

U.S. Pat. No. 3,998,478 to Zopfi discloses a plastic joint construction wherein one piping element has a smooth, plain spigot or cylindrical male end; and a second piping element has a female end receiving said male end and having an inner length portion with an inside diameter tapering inwardly from a size slightly larger than the outside diameter of said male end so that it as a substantially cylindrical socket circumferentially snugly receives the male end. The sealing means of Zopfi, however, require a pliable annular thin ribbon-bodied gasket having a plurality of at least three integral pliable internal annular gripping fins axially spaced on the inner circumference of the female end.

U.S. Pat. No. 4,842,305, to Kistenich, et al, discloses a pipe joint for connecting pipes made of non-shrinkable plastics, preferably polybutene, comprising a sleeve body which has a tapered inside surf ace facing the pipe end and mating the outside surf ace of the pipe end. The joint of Kistenich, however, is made by the action of a heating element embedded in the sleeve body to produce heat on the joint-forming region.

U.S. Pat. No. 5,992,466, to Weise, discloses a bubble jet fitting for use in a spa providing for a lay-length short enough to allow its installation within a six-inch dam wall having an outlet portion which in one use provides for solvent welding within a standard size of PVC pipe.

Hence, it would be useful to have a receptacle for an inverted U-shaped pipe fitting with an opening at the top that a common person with limited skills will be able assemble with common plumbing pipe and fittings, thus providing an economical and easy way to create a siphon apparatus.

SUMMARY

The disclosed embodiments relate in general to an adaptor for coupling pipes together. More particularly, the adapter includes a pair of spaced apart pipe members disposed parallel to each other, and a bridging member that connects the pair of pipe members, and defines a passage between the pipe members that is open at the top producing an inverted U shaped fitting that appears as a pair of shorts cut between the "waist" and "crotch."

In one embodiment, the adaptor comprises a U-shaped member. The U-shaped member may be substantially flat along a top edge, thereby allowing a second U-shaped pipe to be nested inside the top openings in a manner that provides for fluid flow through the second U-shaped pipe. In another embodiment, the pair of spaced apart pipe members comprises an H-shaped member.

In still another one embodiment, the adapter includes a pair of spaced apart pipe members disposed parallel to each other, with each pipe member including an opening at its top and bottom that is adapted to receive an additional pipe, and a bridging member that connects the pair of pipe members defining an open concave passage between the pipe members.

The taper fit is commonly employed in commercially available plastic pipe fittings, is standard in those of polyvinyl chloride (PVC) and acrylonitrile butadiene styrene (ABS), and may be produced in pipes made of other plastics including natural plastic materials such as shellac as well as chemically modified natural materials such as rubber, nitrocellulose, collagen and galalite, and other synthetic molecules such as bakelite, epoxy, high-density polyethylene polypropylene (PP), polystyrene (PS), polyamides (PA) polycarbonate (PC), polyurethanes (PU) and their combinations and derivatives. In a taper fit PVC or ABS pipe, the diameter of the socket narrows slightly a short distance from the entrance of the socket, a female receiving member, to produce a conical shape to create an interference fit when pipe is inserted into the socket. In addition, a small lip protrudes into the inner channel to prevent the inserted pipe member from being inserted beyond the taper.

Further aspects of the disclosed embodiments include a solvent weld pipe adaptor to mechanically locate two parallel pipes in close proximity to each other and connected by a short proximal bridging member between the parallel pipes, each having interior and exterior surface, an inner channel, and a solvent weld socket being a female receiving member having an inner channel with a taper fit such that the inside diameter tapers inwardly from the distal bottom opening and has a small lip protruding from the interior surface into the inner channel a short distance proximal to the distal bottom opening to provide a solvent weld socket of tapering dimensions consistent with plastic pipe standards. The solvent weld pipe adaptor may be coupled as a female receiving member snugly receives a male end and prevents the narrower male inserting pipe member from being inserted beyond it. In a specific embodiment, the opening at the top of the short bridging member is substantially flat along a top edge.

In yet another embodiment, a kit for coupling pipes together is provided. The kit includes an adaptor having a pair of spaced apart pipe members disposed parallel to each other, with each of the pair of pipe members including an opening at the top, i.e., first end, and bottom, i.e., second end, to receive an additional pipe, and a bridging member connecting the pipe members and defining a passage between them; and (2) at least one additional pipe member adapted for placement within an opening of the pair of pipe members. Preferably, the additional pipe member is adapted for placement within the opening of the pair of pipe members through frictional engagement, such as through a "taper fit" commonly employed in PVC pipe fittings. However, the use of adhesives or male/female threads also may be desired depending on the application.

The kit for coupling pipes comprises: a) a solvent weld pipe adaptor to mechanically locate two parallel pipes in close proximity to each other and connected by a short proximal bridging member between the parallel pipes, each having interior and exterior surface, an inner channel, and a solvent weld socket being a female receiving member having an inner channel with a taper fit such that the inside diameter tapers inwardly from the distal bottom opening and has a small lip protruding from the interior surface into the inner channel a short distance proximal to the distal bottom opening to provide a solvent weld socket of tapering dimensions consistent with plastic pipe standards; and b) at least one additional pipe member having an outside diameter slightly narrower than the inside diameter of the distal bottom opening of the parallel pipes and adapted for placement as a male end within the female receiving member of one of the pair of the parallel pipes through frictional engagement through taper fit commonly employed in PVC pipe fittings. Each of the distal bottom sockets, may be coupled as a female receiving member to snugly receive a male end and prevent the narrower male inserting pipe member from being inserted beyond it. Typically, the male member is bonded to the receiving end with a suitable adhesive. The adhesives most commonly employed in PVC pipe fittings is the solvent weld that requires no solder or other manufacturing equipment and may be employed by the home craftsman or independent building contractor. In a second embodiment of the kit, the spaced apart pipe members have female threads on the interior surface for slightly several inches of the distal bottom socket end and the male pipe members have male threads on the exterior surface on the exterior surface of the proximal top socket end and sealed with standard pipe dope or sealant tape, again by the home craftsman or independent building contractor.

Methods suitable for non-industrial use by a common person of limited skills is also disclosed whereby such a home craftsman may obtain fluid flow through two parallel pipes in close proximity to each other and extendable by solvent weld comprising the steps of: a) designing the pipe structure required for the project needs; b) measuring the distance required between the two parallel pipes and the longitudinal space that may be allotted for an adaptor; c) selecting a solvent weld pipe adaptor comprising two parallel pipes in close proximity to each other and connected by a short proximal bridging member between the parallel pipes, each having interior and exterior surface, an inner channel, and a solvent weld socket being a female receiving member having an inner channel with a taper fit such that the inside diameter tapers inwardly from the distal bottom opening and has a small lip protruding from the interior surface into the inner channel a short distance proximal to the distal bottom opening to provide a solvent weld socket of tapering dimensions consistent with plastic pipe standards of the appropriate size for the project; d) selecting pipes with an exterior diameter slightly narrower than the inside diameter at the opening of the solvent weld sockets located at the distal bottom openings of the two parallel pipes for insertion into the female receiving members as male ends; e) extending the length of the parallel pipes by coupling the solvent weld socket female receiving members with a male end of suitable size and inserting the narrower male inserting pipe member as far as the lip inside the inner channel.

The method may further comprise the additional steps of: e) selecting additional pipe members and solvent weld adaptors to create the system required for the project; f) inserting the additional pipe members by solvent weld sockets. In this method, the additional pipe member is a second U-shaped member that is inserted into the top opening of the parallel pipes and bridging member to form a siphon as disclosed in U.S. Pat. No. 7,717,474. The additional pipe member may alternatively be an H-shaped member. The method, with or without the siphon, may be used to assemble pipe structures by the home craftsman that are useful in building aquariums, hot tubs, ponds, swimming pools, drainage systems and repair plumbing pipes at the home or small office.

Additional features and advantages of the invention will be forthcoming from the following detailed description of certain specific embodiments when read in conjunction with the accompanying drawings. For example, the disclosed kit may further include a plurality of additional pipe members that comprise the components of an apparatus, such as an overflow siphon. Hence, the disclosed embodiments may be scalable to cover a wide range of application and flow requirements.

DETAILED DESCRIPTION OF EMBODIMENTS

Figure 1:
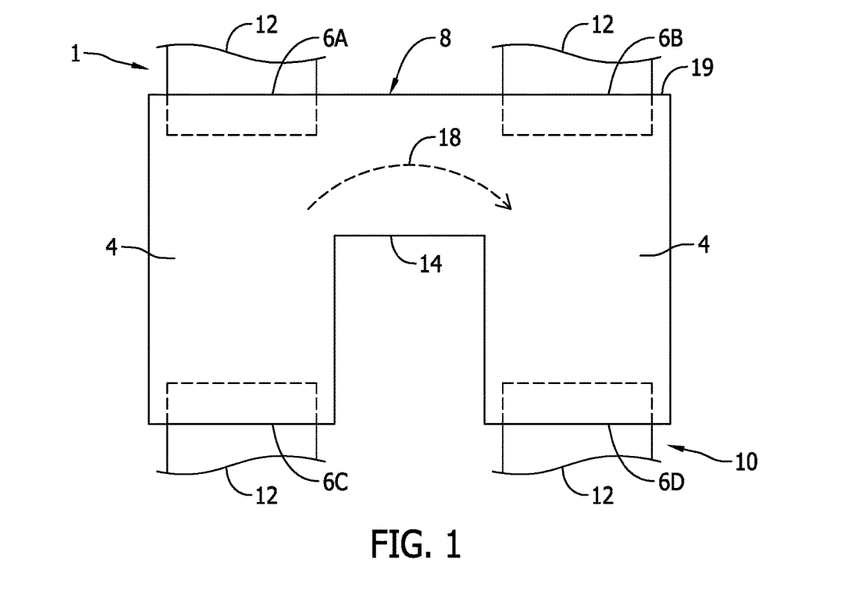
FIG. 1 is a U-shaped adaptor for coupling pipes together according to one exemplary embodiment.

Referring to FIG. 1, a U-shaped adaptor 1 for coupling pipes together is provided. The adaptor 1 includes a pair of spaced apart pipe members 4 disposed parallel to each other, wherein each of the pair of pipe members 4 includes an opening 6A-6D at a top 8 and at a bottom 10 of the pipe members. As shown, each opening 6A-6D is adapted to receive an additional pipe 12.

Figure 2:
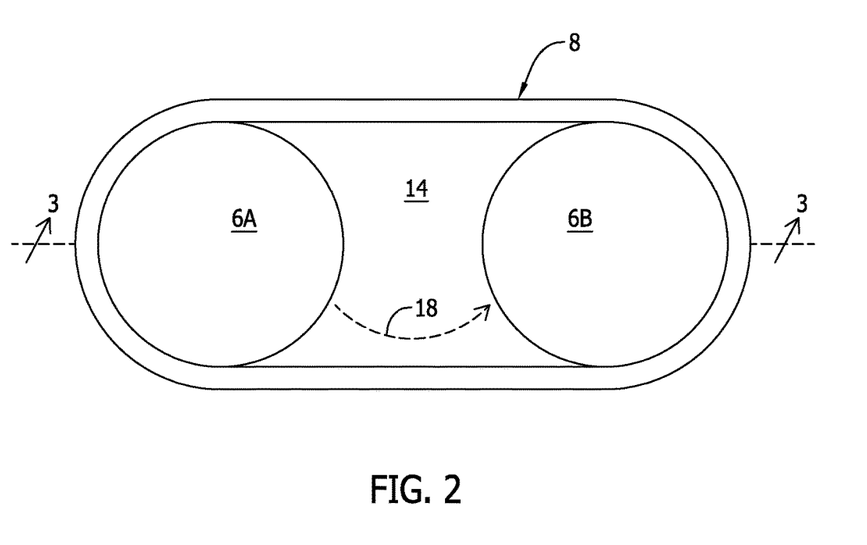
FIG. 2 is a top view of the adaptor shown in FIG. 1.
Figure 3:
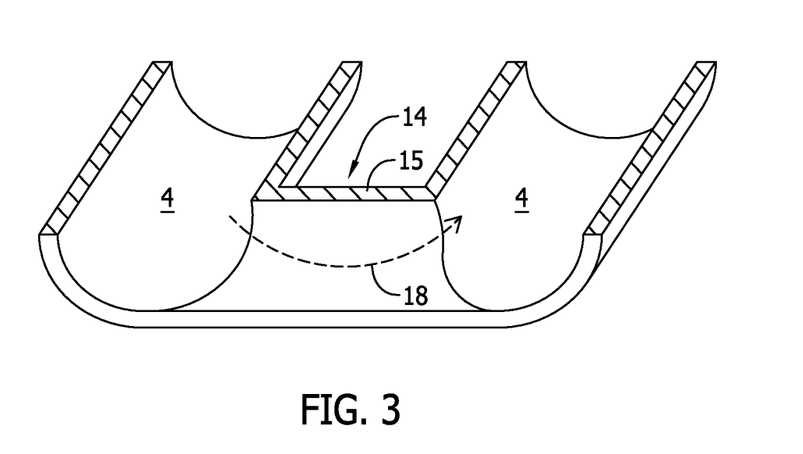
FIG. 3 is a cross-section view of the adaptor shown in FIG. 1

The pair of pipe members 4 are spaced apart by a bridging member 14 that defines a straight member 15 with a half-round cross-section with the concave side 18 of the half-round cross section being oriented towards the top 8 of the pipe members (the straight member 15 and concave side 18 being more clearly shown in FIGS. 2 and 3). The purpose of the concave side 18 is to provide a concave channel for nesting additional pipe structures within the adaptor. Indeed, depending on the additional pipe structure(s), no fluid may flow through the concave side 18 (see, for example, FIG. 5). Moreover, the adaptor 1 may be substantially flat along a top edge 19 to best interface or nest with additional structures, such as pipe members 12.

Turning to FIG. 2, a top view of the embodiment shown in FIG. 1 is shown. The cross-sectional view of FIG. 3 reveals the bridging member 14 of this embodiment includes both a straight member 15 formed with a half-round cross-section and a generally concave side 18 that is open (i.e., not covered) toward the top 8 (FIG. 1) and through which fluid (indicated by arrows) may flow, and more preferably where additional pipe structures may nest.

Figure 4:
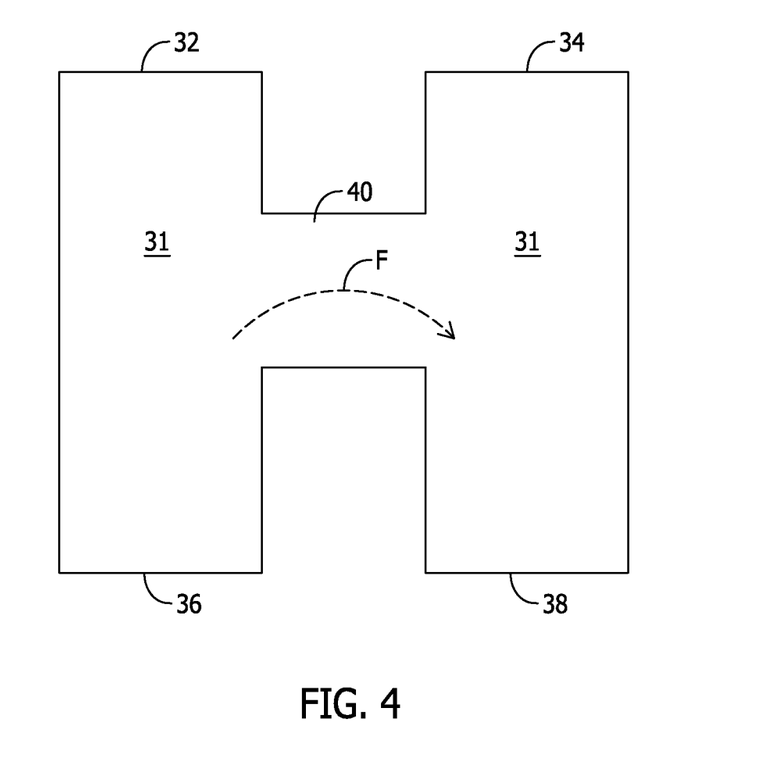
FIG. 4 is an H-shaped adaptor for coupling pipes together according to one exemplary embodiment.

A second embodiment of the invention is illustrated in FIG. 4. As shown, the adaptor comprises a generally H-shaped member 30 that includes a pair of pipes 31 having openings 32, 34, 36 and 38 disposed in parallel and connected by a bridging member 40. As indicated, bridging member 40 may be an open passage that allows fluid F to flow between the pipes 31.

Figure 5:
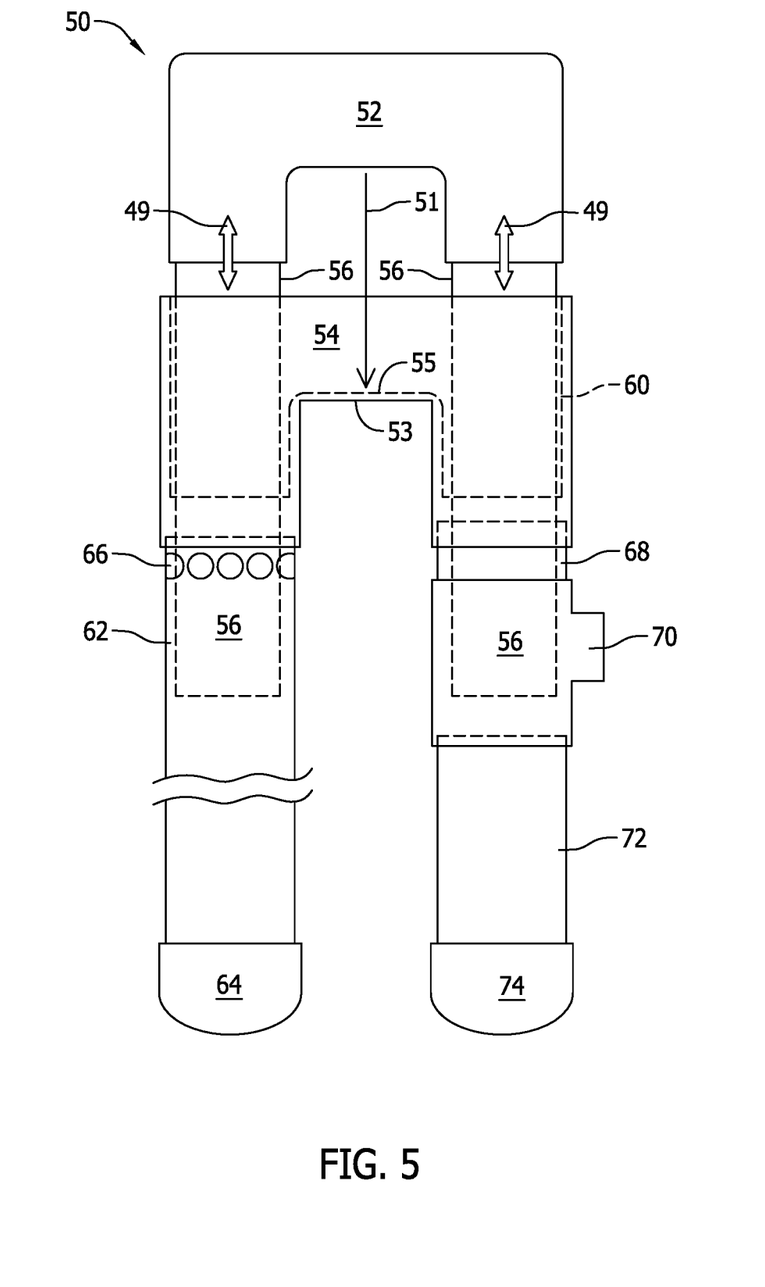
FIG. 5 is a partially assembled side view of a kit for coupling pipes together according to one embodiment.
Figure 6:
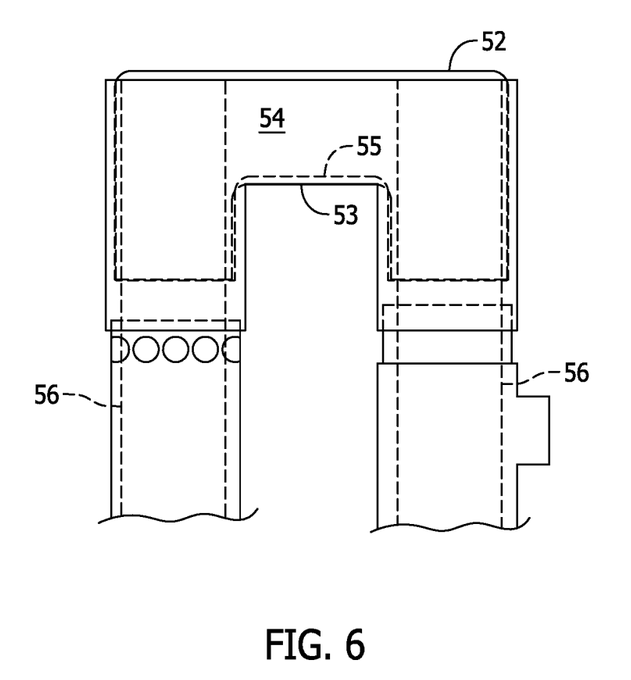
FIG. 6 is assembled side view of the kit of FIG. 5.

Turning to the embodiment shown in FIG. 5 and FIG. 6, a kit for coupling pipes together is disclosed. The kit 50 includes an adaptor 54 that is configured to receive at least one additional pipe member, such as U-shaped member 52 having legs 56. U-shaped member 52 may be frictionally engaged within adaptor 54 through tapered walls 60, thus creating a seal within adaptor 54. Moreover, due to the frictional engagement, U-shaped member 52 also may be removed from adaptor 54 (as indicated by arrows 49). Alternatively, an adhesive, such as PVC cement, may be used to join the kit components as desired. In this embodiment, when the U-shaped member 52 is nested within adaptor 54 (as depicted by arrow 51), the U-shaped member contacts bridging member 53 along the open concave side 55.

Additional components may be included in the kit 50. Coupled to the bottom of adaptor 54 is a pipe 62 having an end cap 64 and openings 66, and a pipe 68 which includes a T-junction 70 attached to a pipe 72 that has an end cap 74. All of these components, including adaptor 54, may be economically produced and sold as a kit for assembly into an overflow siphon useful for exchanging water between an aquarium tank and filter. Thus, the adaptor of the invention facilitates the coupling of kit components in a simple and low-cost manner.

Figure 7:
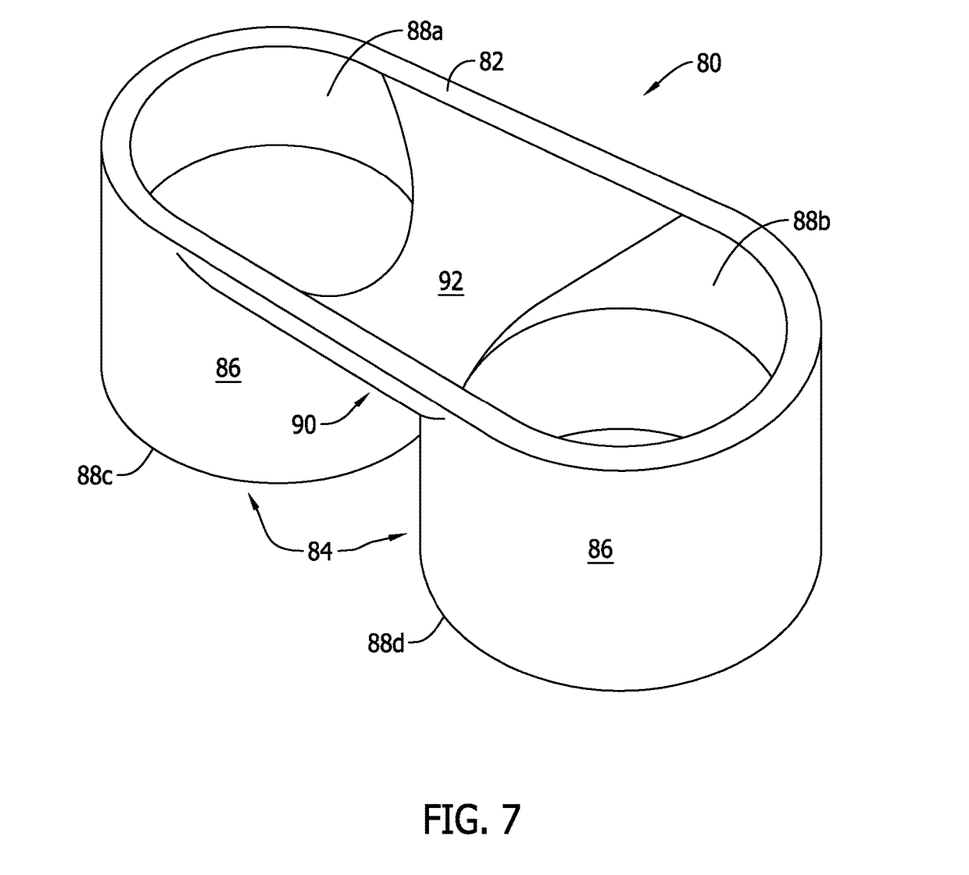
FIG. 7 is a perspective view of an adaptor for coupling pipes according to one exemplary embodiment.
Figure 8A:
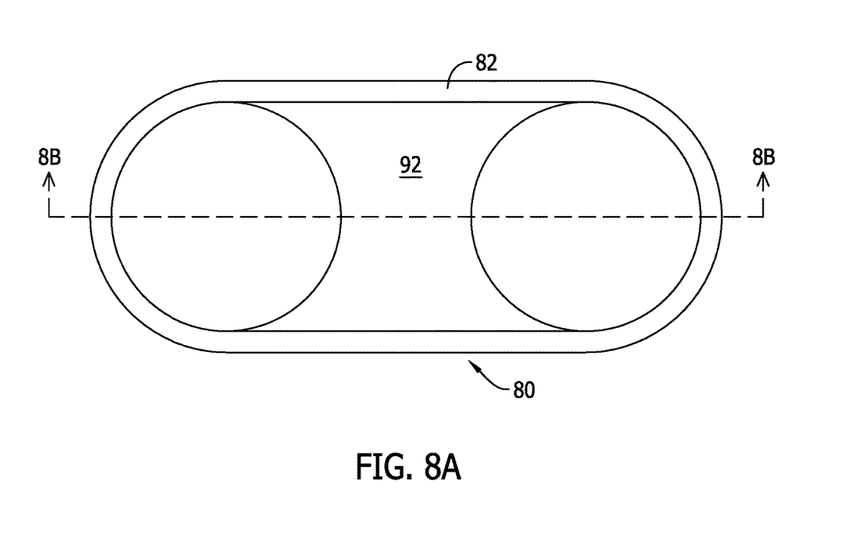
FIG. 8A is a top view of the adaptor shown in FIG. 7.
Figure 8B:
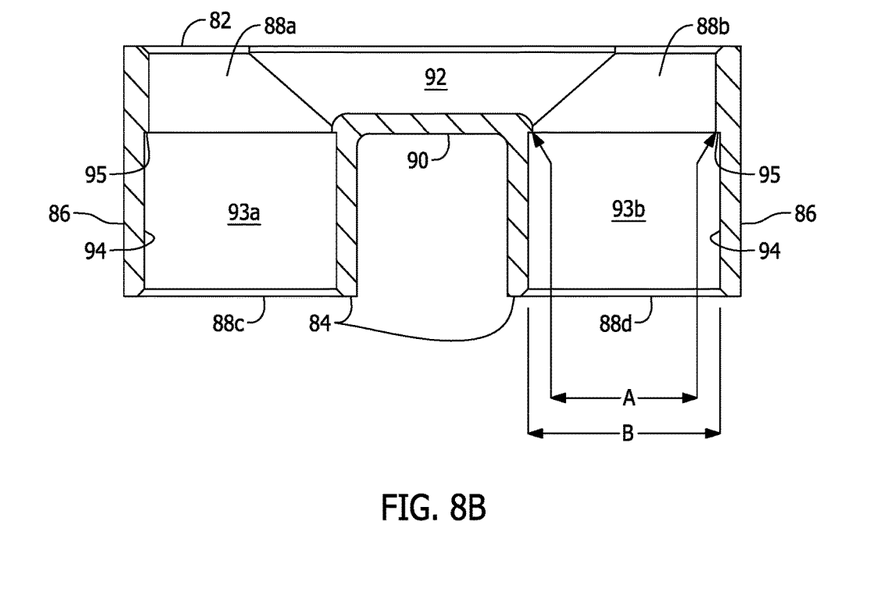
FIG. 8B is a cross section view taken along the line 8A-8A shown in FIG. 8A.

Turning to the embodiment shown in FIGS. 7, 8A, and 8B, an embodiment of an adaptor is disclosed. The adaptor 80 has an open top end 82 and a distal bottom end 84 and further includes two parallel pipes 86 in close proximity to each other adapted for fluid flow there through, wherein the pair of pipe members 86 include a first pair of openings 88a, 88b at the adaptor open top end 82 and a distal bottom pair of openings 88c, 88d at the adaptor distal bottom end 84. Each of the top and distal bottom pair of openings 88a, 88b, 88c, 88d are adapted to receive an additional pipe. A bridging member 90 connects the pair of spaced apart pipe members 86 and defines inside and proximal to the open top end 82 of the adaptor 80 a straight member 92 with a half-round cross section between the pair of spaced apart pipe members 86.

Furthermore, the openings 88a, 88b, 88c, 88d are formed such that pipes of a first pair of pipe members may each be received in a concentric arrangement with each of the spaced apart pipes 86. The bottom openings 88c, 88d may further be configured such that pipes of a second pair of pipe members may be received in a concentric arrangement with the first pair of pipes (such as shown in FIG. 5, wherein legs 56 of the U-shaped member 52 are concentrically disposed inside pipes 62 and 68).

The adaptor 80 itself preferably is formed to receive pipe members at each end in concentric arrangement. As shown in FIG. 8B, this may be accomplished by having the top pair of openings 88a, 88b at the open top end 82 be of a smaller diameter A than a diameter B of the distal bottom pair of openings 88c, 88d at the bottom end 84. That is, the inner surface 94 of the pipe members 86 is defined by a first smaller diameter A and a second larger diameter B.

The bottom openings 88c, 88d define a socket weld distal bottom openings for receiving a pair of pipes, such as the pipes 62 and 68 (FIG. 5). An inner channel 93a, 93b is defined by an inner wall that tapers to narrow toward a lip 95 of the socket weld of the openings 88c, 88d. The lip 95 serves as a stop such that pipes inserted into the opening 88c, 88d (such as pipes 62, 68) do not extend past the lip 95 within the adaptor 80. To facilitate the concentric pipes, a diameter B of the inner wall at the opening 88c, 88d is larger than a diameter A above the lip 95 and at openings 88a, 88b. In this example the diameter B at the bottom opening 88c, 88d is 1.325 inches, and the diameter A at the top openings 88a, 88b above the lip 95 is 1.310 inches.

In this manner, the openings 88c, 88d can receive pipes 62, 68 such that the pipes 62, 68 are parallel to one another. That is, pipes 62, 68 may be connected via the socket weld portion of the openings 88c, 88d. The socket weld portion may be similar to standard connections used in PVC pipes as are known in the art. The adaptor 80 further provides that the pipes 62, 68 are parallel and in close proximity to one another. Additionally, because the adaptor 90 has the open top 82, pipes or other devices can be inserted down into the adaptor 90, such as pipes 56 attached to the u-shaped member 52.

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

It is claimed:

1. A solvent weld pipe adaptor comprising:
  a pair of parallel pipe members, the parallel pipe members each comprising a first opening at a first end and a second opening at a second end, the first opening having a first diameter and the second opening having a second diameter that is larger than the first diameter, an inner surface of the parallel pipe members defining an inner channel, the inner channel comprising a lip, the inner channel comprising the first diameter from the lip to the first opening, and the inner channel defining a socket having the second diameter from the lip to the second opening; and a bridging member connecting the parallel pipe members, the bridging member being disposed adjacent to the first openings, and the bridging member being a straight member between the parallel pipe members and having a half-round cross-section with a concave side of the half-round cross-section open towards the first end.

2. The solvent weld pipe adaptor of claim 1, wherein the socket receives a separate pipe member, and the lip is configured to stop the separate pipe member from extending beyond the lip in the inner channel.

3. The solvent weld pipe adaptor of claim 2, wherein the first openings are configured to receive parallel tube members that are configured to extend within the inner channel and the separate pipe member.

4. The solvent weld pipe adaptor of claim 1, wherein said pipe adaptor is comprised of a plastic material selected from the group consisting of polyvinyl chloride (PVC), acrylonitrile butadiene styrene (ABS), shellac, rubber, nitrocellulose, collagen, galalite, bakelite, epoxy, high-density polyethylene polypropylene (PP), polystyrene (PS), polyamides (PA) polycarbonate (PC), polyurethanes (PU) and their combinations and derivatives.

5. The solvent weld pipe adaptor of claim 4, wherein said pipe adaptor is composed of polyvinylchloride (PVC) or acrylonitrile butadiene styrene (ABS).

6. The solvent weld pipe adaptor of claim 1, wherein the bridging member between the parallel pipe members comprises a flat top surface at the first end.

7. A kit for coupling pipes comprising:
a solvent weld pipe adaptor comprising:
  a pair of parallel pipe members, the parallel pipe members each comprising a first opening at a first end and a second opening at a second end, the first opening having a first diameter and the second opening having a second diameter that is larger than the first diameter, an inner surface of the parallel pipe members defining an inner channel, the inner channel comprising a lip, the inner channel comprising the first diameter from the lip to the first opening, and the inner channel defining a socket having the second diameter from the lip to the second opening; and
  a bridging member connecting the parallel pipe members, the bridging member being disposed adjacent to the first openings, and the bridging member being a straight member between the parallel pipe members and having a half-round cross-section with a concave side of the half-round cross-section open towards the first end; and
separate pipe members configured to be received within the sockets, and the separate pipe members extending into the sockets up to the lip,
wherein pipes are coupled by inserting the pipes into the first openings of the pipe adaptor and through the separate pipe members.

8. The kit according to claim 7, further comprising an adhesive to adhere the separate pipe members in the sockets.

9. The kit according to claim 7, further comprising at least one of standard pipe dope, sealant tape, and PVC cement whereby the separate pipe members are fixed within the sockets.

10. The kit according to claim 7, wherein the pipes coupled by the kit are accessible in the concave side of the half-round cross-section of the bridging member.

11. A method for coupling pipes, the method comprising:
providing a solvent weld pipe adaptor comprising:
  a pair of parallel pipe members, the parallel pipe members each comprising a first opening at a first end and a second opening at a second end, the first opening having a first diameter and the second opening having a second diameter that is larger than the first diameter, an inner surface of the parallel pipe members defining an inner channel, the inner channel comprising a lip, the inner channel comprising the first diameter from the lip to the first opening, and the inner channel defining a socket having the second diameter from the lip to the second opening; and
  a bridging member connecting the parallel pipe members, the bridging member being disposed adjacent to the first openings, and the bridging member being a straight member between the parallel pipe members and having a half-round cross-section with a concave side of the half-round cross-section open towards the first end;
inserting separate pipe members within the sockets, the separate pipe members extending into the sockets up to the lip; and
inserting pipes to be coupled into the first openings of the pipe adaptor and through the separate pipe members.

12. The method of claim 11, further comprising fixing the separate pipe members within the sockets via an adhesive.

13. The method of claim 11, wherein the pipes to be coupled are accessible in the concave side of the half-round cross-section of the bridging member.

\* \* \* \* \*